United States Patent [19]

Foster

[11] Patent Number: 4,749,075
[45] Date of Patent: Jun. 7, 1988

[54] HOLD DOWN MEMBER FOR A RECIPROCATING FLOOR CONVEYOR

[76] Inventor: Raymond K. Foster, P.O. Box 1, Madras, Oreg. 97741

[21] Appl. No.: 58,156

[22] Filed: Jun. 4, 1987

[51] Int. Cl.⁴ .................................... B65G 25/04
[52] U.S. Cl. ................... 198/750; 198/775; 414/525 R
[58] Field of Search ............ 198/750, 773–775; 414/525 R; 52/730, 731, 738

[56] References Cited

U.S. PATENT DOCUMENTS

| | | | |
|---|---|---|---|
| 4,143,760 | 3/1979 | Hallstrom | 198/750 |
| 4,144,963 | 3/1979 | Hallstrom | 198/750 |
| 4,184,587 | 1/1980 | Hallstrom | 198/750 |
| 4,492,303 | 1/1985 | Foster | 198/750 |
| 4,611,708 | 9/1986 | Foster | 198/750 |
| 4,679,686 | 7/1987 | Foster | 198/750 |

OTHER PUBLICATIONS

PCT document No. WO84/03686, Foster, Sep. 27, 84 (27.09.84).

Primary Examiner—Robert J. Spar
Assistant Examiner—D. Glenn Dayoan
Attorney, Agent, or Firm—Barnard Delbert J.

[57] ABSTRACT

A floor member (10) of channel form is pushed downwardly to install it onto bearings (72) and hold down members (16) which were previously installed on longitudinal guide tubes (12) which extend in the same direction as the floor members (10). The bearings (72) have sidewall portions which slope downwardly and outwardly to lower edge (96, 98). These sidewalls (76, 78) are connected at their upper portions to the bearing (72) in such a way that they will flex inwardly, into spaces (112, 114) provided for them, in response to a downward "snap on" movement of the floor members (10). The hold down members (16) have hold down wings (50, 52) which slope downwardly and outwardly to lower edges (54, 56). The hold down wings (50, 52) also flex inwardly, into spaces provided for them, in response to a downward "snap on" movement of the floor member (10). Any upward force applied on an installed floor member (10) will move inner edge portions (28, 30) of its bottom flanges (24, 26) into contact with the lower edges (54, 56) of the hold down wings (50, 52) of the hold down member (16). The hold down member (16) in effect functions to connect the longitudinal guide beam (12) to the floor member (10), so that the stiffness of the longitudinal guide beam (12), and its connection to other frame members (14) will help resist upward movement of the floor member (10) off from its support.

26 Claims, 4 Drawing Sheets

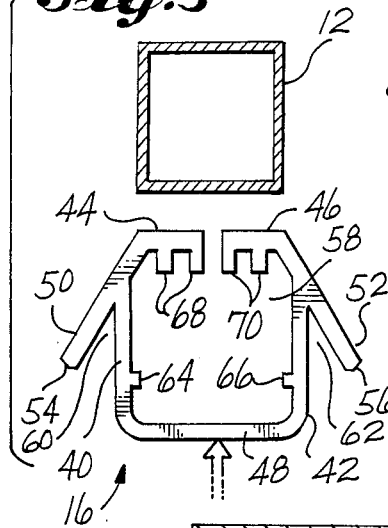
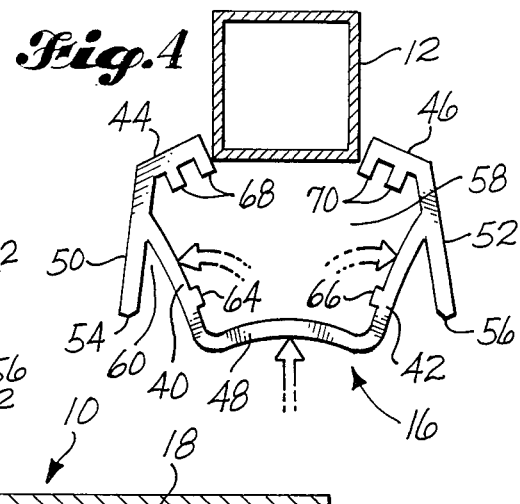

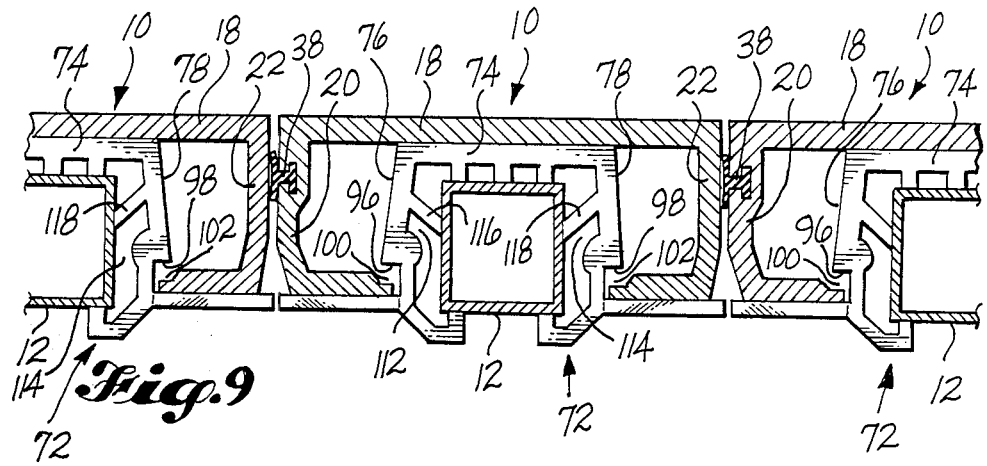
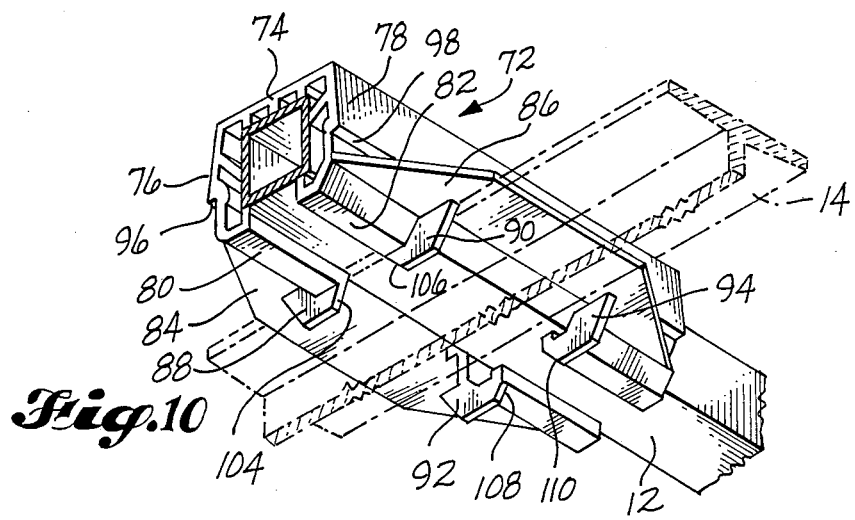
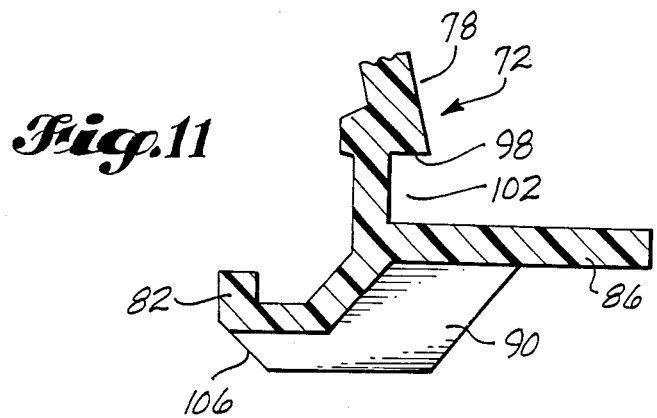

4,749,075

HOLD DOWN MEMBER FOR A RECIPROCATING FLOOR CONVEYOR

DESCRIPTION

1. Technical Field

This invention relates to reciprocating floor conveyors, and in particular to the provision of hold down members for resisting upward movement of the floor members up off of their bearings, constructed to allow the floor members to be snapped into place from above.

2. Background Art

My U.S. Pat. No. 4,492,303, granted Jan. 8, 1985, and entitled "Drive/Guide System for a Reciprocating Floor Conveyor", presents an example of a reciprocating floor conveyor. U.S. Pat. No. 4,492,303 mentions that the forces which drive or move the floor members back and forth on their bearings sometimes include an upwardly directed component which wants to force the floor members and bearings upwardly. U.S. Pat. No. 4,492,303 discloses slide bearings which include side slots in which the flanges of the floor members are received and wing portions which project outwardly from each bearing into abutting contact with the wing portion of an adjacent bearing. The engagement of the flanges of the floor members in the slots adds the strength and stiffness of the floor members to the bearings. The abutting contact of the wing portions causes the bearings to mutually brace each other as a result, the floor members and bearings function to resist upward movement of the bearings off of their support beams in response to the upwardly directed components of force acting on the floor members.

My copending application Ser. No. 680,069, filed Dec. 10, 1984, now U.S. Pat. No. 4,679,686 and entitled "Bearing System for Reciprocating Floor Conveyor", and my copending application Ser. No. 059376, filed June 4, 1987, and entitled "Bearing System for Reciprocating Floor Conveyor", disclose improved slide bearings for the floor members of a reciprocating floor conveyor. The bearings disclosed by these applications are also constructed to resist being moved off from their support beams in response to upward components of force imposed on them by the moving floor members. The bearings are also constructed in such a manner that they can be easily snapped onto their support beams from above and can also allow the floor members to be snapped into place from above the bearings. The subject invention relates to the provision of hold down members which are attached to the same support beams as the slide bearings and which are constructed to further resist upward movement of the floor members and the bearings off of the support beams.

DISCLOSURE OF THE INVENTION

In basic construction, the hold down members of the invention each comprises a pair of opposite sidewalls, a bottom wall extending between and interconnecting the bottoms of the sidewalls, and two top parts. One of the top parts is connected to the top of one of the sidewalls. The other top part is connected to the top of the other sidewall. The top parts extend laterally inwardly from the tops of the sidewalls and each has an inner boundary that is adjacent the inner boundary of the other. Each side of the hold down member includes a hold down wing. Each hold down wing has a lower edge and each and each wing slopes downwardly and outwardly from the top part on its side of the hold down member to its lower edge. The lower edges of the hold down wings are spaced apart laterally a distance that is wider than the space between the bottom flanges of the floor member. An inner space is defined horizontally by and between the sidewalls and vertically by and between the top parts and the bottom wall. At least one guide beam is located in the inner space. When the hold down member is on a guide beam and a floor member is installed, the lower edges of the wings of the hold down member are situated above the bottom flanges of the floor member. As a result, if an upwardly directed force is imposed on the floor member, the bottom flanges of the floor member, when attempting to move upwardly, will contact the lower edges of the wings of the hold down member and such hold down member, through the contact of its wings with the bottom flanges of the floor member, will resist upward movement of the floor member off of the bearings and the guide beam.

In preferred form, the bottom flanges of each floor member includes upper surface portions bordering the space between the bottom flanges and upwardly extending shoulders which outwardly bound said upper surface portions. The shoulders are positioned to be moved into abutting contact with the lower edges of the wings on the hold down member in response to a predetermined amount of upward movement of the floor member.

Also in preferred form, spaces are defined by and between the wings of the sidewalls of the hold down member into which the wings may swing in response to forces imposed by the bottom flanges of the floor member on the wings of the hold down member as the floor member and the hold down member are being moved relatively together. These spaces allow the wings to move inwardly an amount sufficient to allow the bottom flanges of the floor member to move past them. The wings are stiff enough so that they will swing outwardly into positions over the bottom flanges of the floor member following relative movement of the wall flanges into positions below the lower edges of the wings.

Each sidewall of the hold down member may include a single longitudinal rib spaced upwardly from the bottom wall and situated closer to the bottom wall than to the top parts of the hold down member. These ribs contact sidewalls of the guide beams and properly position the hold down member on the guide beams.

In accordance to an aspect of the invention, the hold down members are positioned on the guide beams in regions of the guide beams which span between transverse support beams for the guide beams. In a preferred system, slide bearings of a type which allow the floor members to be snapped into position from above are located on the guide beams where the guide beams set on the transverse support beams.

Additional features, advantages and objects of the invention are described in the detailed description of the best mode for carrying out the invention. Such detailed description of the best mode, and the appended claims, are also parts of the description of the invention.

BRIEF DESCRIPTION OF THE DRAWING

In the drawings, like element designations refer to like parts throughout, and:

FIG. 3 is an end view of a hold down member positioned between a longitudinal guide beam, prior to its assembly onto the longitudinal guide beam, said longitudinal guide beam being shown in section;

FIG. 4 is a view like FIG. 3, showing opposite side parts of the hold down member being spread apart, and showing the hold down member in the process of being moved upwardly into a position on the longitudinal guide beam;

FIG. 5 is a view similar to FIGS. 3 and 4, following assembly of the hold down member on the guide beam, and showing a floor member sitting on the hold down member, with the inner edges of the flanges of the floor member contacting the wings of the hold down member;

FIG. 6 is a view like FIG. 5, showing the floor member being moved downwardly, and showing lower portions of the wings moving inwardly, to allow passage of the bottom flanges of the floor member;

FIG. 7 is a view like FIGS. 5 and 6, following installation of the floor member on the hold down member, and showing a contact being made between the flanges of the floor member and the lower edges of the wings of the hold down member in response to an upward force acting on the floor member;

FIG. 9 is a sectional view taken through the floor fragment, showing the bearing in end elevation;

FIG. 10 is a fragmentary isometric view of a bearing on a guide beam and the guide beam on a fragmentary portion of a transverse support beam, shown in phantom line; and FIG. 11 is a fragmentary view of a lower reinforced area of the bearing.

BEST MODE FOR CARRYING OUT THE INVENTION

My copending application Ser. No. 905,370, filed Sept. 8, 1986, and entitled Drive/Frame Assembly For A Reciprocating Floor, discloses a presently preferred embodiment of a reciprocating floor conveyor. My aforementioned U.S. Pat. No. 4,492,303 discloses a support and guide frame construction for the floor members. The floor members are connected to transverse drive beams which reciprocate back and forth longitudinally of the floor within a relatively small space. Longitudinal drive beams for the floor members are positioned on both sides of this space. The longitudinal guide members are supported on and connected to transverse support beams. Plastic slide bearings are secured to the guide beams at locations where the guide beams set down on the transverse support beams. My copending application Ser. No. 059,376, filed June 4, 1987, and entitled Bearing System For A Reciprocating Floor Conveyor discloses plastic slide bearings which are constructed to be snapped into place on the longitudinal guide beams and which are constructed to allow the floor members to be snapped into place from above. The contents of application Ser. No. 905,370, U.S. Pat. No. 4,492,303 and application Ser. No. 059,376, are hereby expressly incorporated into this application by this specific reference.

As disclosed in my copending application Ser. No. 905,370, and in my aforementioned U.S. Pat. No. 4,492,303, in use, the floor members of a reciprocating floor conveyor are moved in one direction to advance a load, and are retracted in the opposite direction. The drive systems disclosed by my aforementioned U.S. Application Ser. No. 905,370 and U.S. Pat. No. 4,492,303 each disclose a reciprocating floor conveyor in which the floor members are divided into three sets. All of the floor members are moved in the first direction, to advance the load. They are retracted one set at a time until all floor members are at a start position. Then the operation is repeated.

Figure 1:
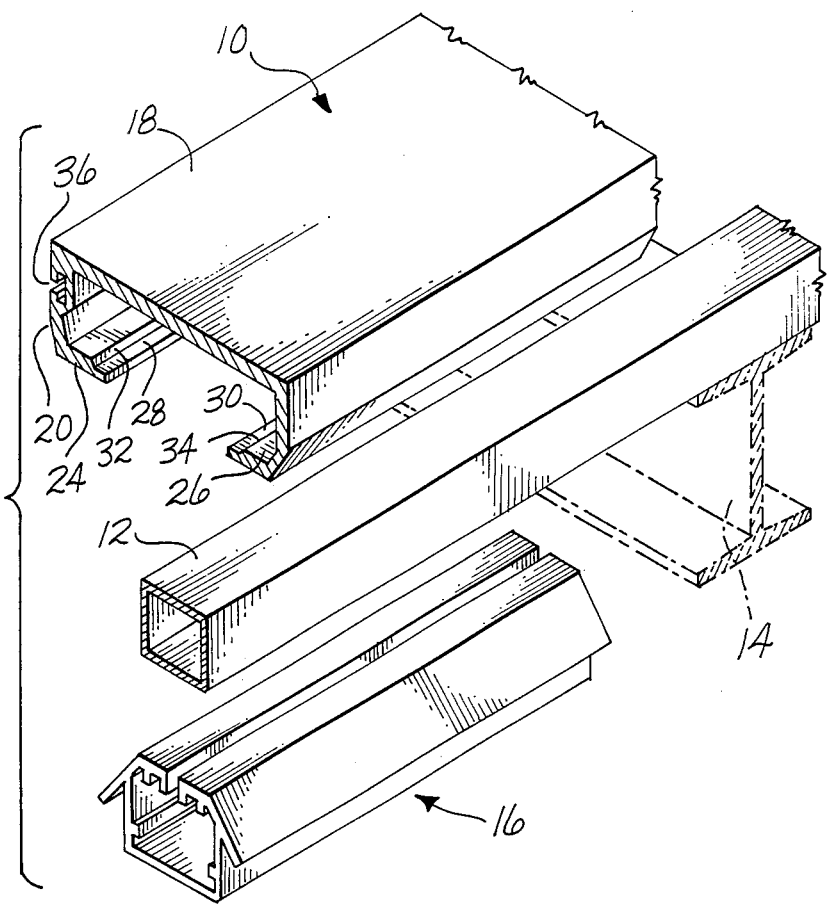
FIG. 1 is an exploded fragmentary isometric view of an assembly comprising a floor member, a longitudinal guide beam, a transverse support beam, and a hold down member, such view being taken from above.
Figure 2:
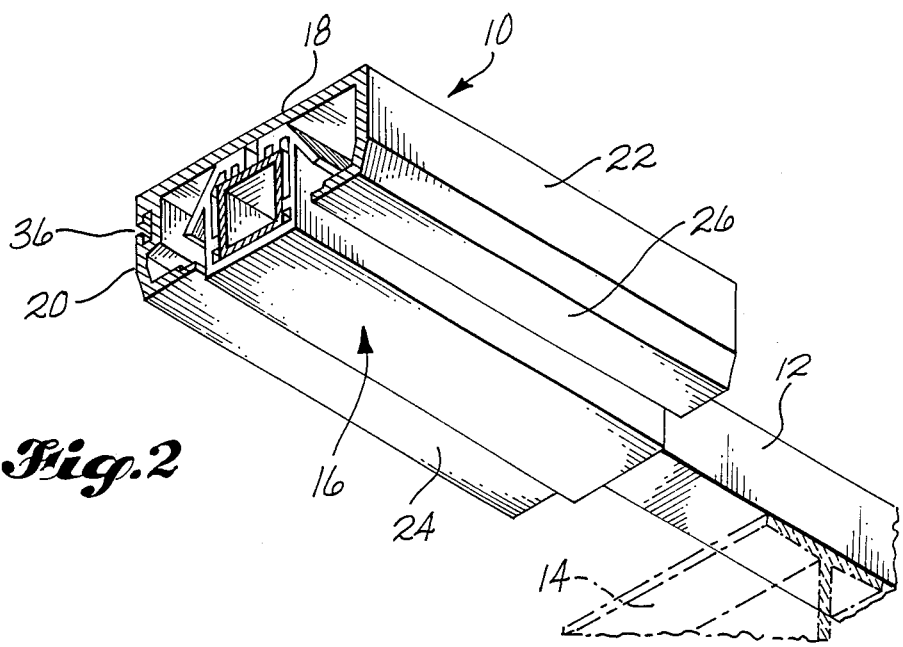
FIG. 2 is a fragmentary assembled isometric view of the components shown by FIG. 1.

Referring now to the drawing, FIG. 1 discloses a floor member 10 spaced above a longitudinal guide beam 12 which is shown sitting on the transverse support beam 14. In FIGS. 1 and 2 the transverse support beam 14 is shown by phantom line. In FIG. 1, a hold down member 16 is shown spaced below the longitudinal guide beam 12. FIG. 2 shows the hold down member 16 positioned on the longitudinal guide member 12 and shows the floor member 10 in its installed position.

The floor member 10 has a top wall 18, opposite sidewalls 20, 22, and a pair of bottom flanges 24, 26. The floor member 10 is in the nature of a downwardly opening channel member. The flanges 24, 26 are spaced apart, in coplanar parallelism, and are both parallel with and offset below the top wall 18. In preferred form, the flanges 24, 26 include reduced thickness portions 28, 30 at their inner edges, and shoulders 32, 34 inwardly bounding the edge portions 28, 30.

As is per se known, sidewall 20 includes a longitudinal slot in which a seal 36 is received. The seal 36 makes sealing contact with a sidewall 20 of an adjoining floor member 10.

In preferred form, the hold down member 16 comprises a pair of opposite sidewalls 40, 42, two top parts 44, 46 and a bottom wall 48. The bottom wall 48 extend between and interconnects the bottoms of the sidewalls 44, 46.

Top part 44 is connected to the top part of sidewall 40 and top part 46 is connected to the top part of sidewall 42. The top parts 44, 46 extend laterally inwardly from the tops of the sidewalls 40, 42 and each has an inner boundary that is adjacent the inner boundary of the other. Hold down member 16 includes a pair of hold down wings 50, 52, one on each of its sides.

Hold down wing 50 is connected to side 40 and hold down wing 52 is connected to sidewall 42. Each hold down wing 50, 52 slopes downwardly and outwardly from the top part 44, 46 on its side of the hold down member 16. Each hold down wing 50, 52 includes a lower edge 54, 56. The lower edges 54, 56 are spaced apart laterally a distance that is wider than the space between the bottom flanges 24, 26 of the floor member 10 (FIG. 5) the distance between the outer surfaces of the sidewalls 40, 42, in the region of hold down member 16 below the hold down wings 50, 52, is smaller than the distance between the flanges 24, 26 of the floor member 10 (FIG. 5).

An inner space 58 is defined horizontally by and between the sidewalls 40, 42, and vertically by and between the top parts 44, 46 and the bottom wall 48. This space 58 is sized to receive at least one guide beam 12. The illustrated embodiment shows a space 58 which is sized to receive a single guide beam 12. My aforementioned copending application Ser. No. 059,376 discloses using two spaced apart guide beams for supporting and guiding each floor member. The bearings are constructed to fit onto both of the guide beams. A hold down member 16 could be constructed in a similar manner. That is, the space 58 could be made wide enough to receive in it two laterally spaced apart guide beams 12.

Spaces 60, 62 are defined by and between the hold down wings 50, 52 and the sidewalls 40, 42. The hold down member 16 is constructed from a structural plastic material which is tough and relatively rigid, but which can bend. The wings 50, 52 are capable of bending inwardly into the spaces 60, 62 until the horizontal distance between the outer portions of the lower edges 54, 56 equal the width of the space that is defined by and between the flanges 24, 26 of the floor member 10.

The hold down member 16 is installed onto the guide beam 12 in a quick and easy manner. The hold down member 16 is moved into a position below the guide beam 12, as shown by FIG. 3. Then, as shown by FIG. 4, forces are applied to the sidewalls 40, 42, for spreading them apart in the manner illustrated. This opens up the space between the inner boundaries of the top parts 44, 46, until such space is large enough to receive the width dimension of the guide beam 12. Then, the hold down member 16 is moved upwardly. It is moved upwardly until the top parts 44, 46 are above the guide beam 12. Upon this happening spring energy within the portions of the hold down member 16 which were stressed causes the side parts of the hold down member 16 to move inwardly, to place the sidewalls 40, 42 into contact with side portions of the guide beam 12, and position the top parts 44, 46 above the top of the guide beam 12 (FIG. 5).

Preferably, each sidewall 40, 42 includes a single rib 64, 66 which extends longitudinally of the space 58, projects laterally into the space 58, and is situated closer to the bottom wall 48 than to the top parts 44, 46. Preferably also, the top parts 44, 46 include ribs 68, 70 which extend longitudinally of the space 58 and project downwardly into the space 58. The horizontal distance between the ribs 64, 66 is preferably slightly less than the nominal width dimension of the guide beam 12. The vertical distance between the ribs 68, 70 and the bottom wall 48 is preferably slightly less than the nominal vertical dimension of the guide beam 12. This results in the hold down member 16 having to spread apart slightly in order to accommodate the guide beam 12 within the space 58. It also compensates for tolerance differences in the manufacture of the hold down member 16 and the guide beams 12.

Figure 8:
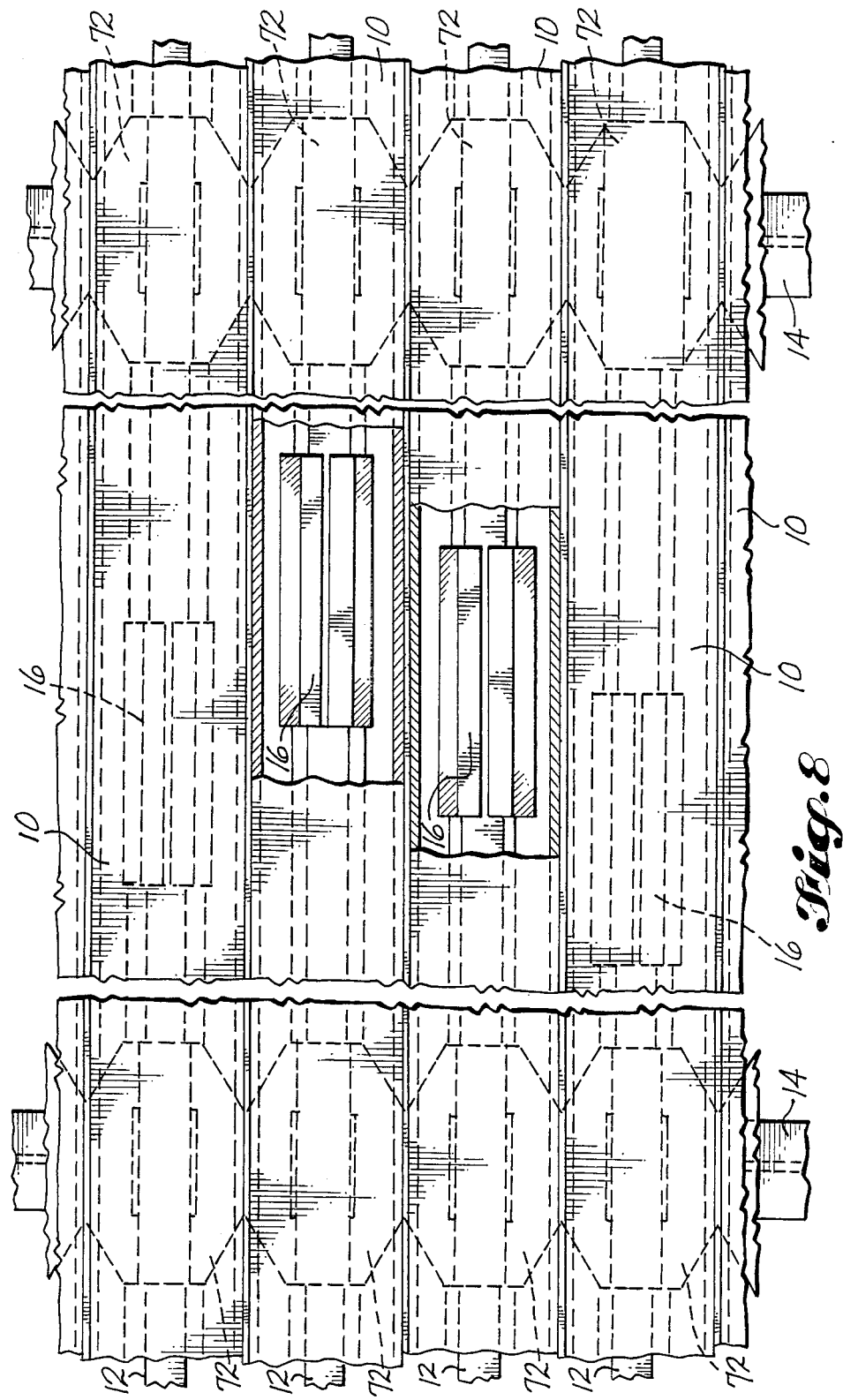
FIG. 8 is a fragmentary top plan view of a portion of a reciprocating floor conveyor, showing a plurality of side-by-side floor members, and showing two transverse support members, slide bearings on the guide beams where the guide beams sit on the transverse support members, and showing hold down members on the guide beams in span regions between the transverse support beams, with top portions of two of the floor members being cut away to expose top plan views of two installed hold down members.

FIG. 8 is a fragmentary top plan view of a portion of a floor which is slightly wider than four floor members and is of a length to include a pair of transverse support beams. FIG. 8 shows a bearing 72 positioned at each location where a longitudinal guide beam 12 intersects a transverse support beam 14. The hold down members 16 are placed on the longitudinal guide beams 12 in span regions of these beams 12, i.e. the regions which span between the support beams 14. Paragraph 9-11 discloses the bearing construction which is part of the subject matter of my aforementioned copending application Ser. No. 059,376. Bearing 72 comprises a top wall 74, sidewalls 76, 78, bottom flanges 80, 82, side wings 84, 86 and gussets 88, 90, 92, 94. The sidewalls 76, 78 slope outwardly and downwardly as they extend from the top wall 74 down to lower edges 96, 98. The slot 100 is defined vertically between lower edge 96 and wing 84. On the opposite side of the bearing, a slot 102 is formed vertically between lower edge 98 and wing 86. The bearing has a width dimension at the level of the lower edges 96, 98 which is wider than the horizontal space between the flanges 24, 26 of the floor member 10. The gussets 88, 90, 92, 94 include inner end surfaces 104, 106, 108, 110 which slope downwardly and outwardly from their location of connection to the wings 84, 86. When the bearings 72 are set down on the longitudinal guide beams 12, these end surfaces 104, 106, 108, 110 contact the upper corners of the longitudinal guide beams 12. Owing to this arrangement, and further owing to the fact that the bearings 74 are constructed from a structural plastic material which has spring characteristics, one need only press vertically downwardly on the bearing 72 in order to install it onto the longitudinal guide beam 12. The gusset end surfaces 104, 106, 108, 110 function, in response to the downward force, to cam the side parts of the bearing apart so as to expand the horizontal space between the lock flanges 80, 82 a sufficient amount to allow passage of the longitudinal guide beam 12 into the inner space of the bearing 72. The bearing 72 moves downwardly as the longitudinal guide beam 12 moves into the same space. When ribs depending from the top wall 74 of the bearings 72 contact the top wall of the longitudinal guide beam 12 the lock flanges 80, 82 will have past below the lower surface of the longitudinal guide beam 12. When this happens, the spring energy in the bearing material 72 will cause the side parts of the bearing 72 to spring inwardly, to place the lock flanges 80, 82 below the longitudinal guide beam 12.

The hold down members 16 and the bearings 72 are all installed in the manner that has been described. Then, the floor members 10 are installed. This is done by setting a floor member downwardly on top of the bearings 72 and the hold down members 16 which are attached to its longitudinal guide beam 12. FIG. 5 shows the position of the floor memer 10 on the hold down member 16. As shown, the inner edge portions 28, 30 of the floor member flanges 24, 26 rest on the sloping surfaces of the hold down wings 50, 52. The horizontal space between the flanges 24, 26 is larger than the width dimensions of the bearings 72 at the tops of the bearings. As a result, an upper portion of the bearings 72 will fit into the space between the bottom flanges 24, 26 and the inner edge portions 28, 30 of the bottom flanges 24, 26 will contact the sloping sidewalls 76, 78 of the bearings 72. Next, all the installer has to do is step downwardly onto the floor member. Spaces 112, 114 are defined laterally between the bearing sidewalls 76, 98 and the sidewalls of the longitudinal guide beam 12. Positioning ribs 116, 118 extend inwardly and downwardly from the bearing sidewalls 76, 78. Owing to the fact that they are sloped, the ribs 116, 118 will bend in response to a squeezing together of the bearing sidewalls 76, 78. A downward force applied on the floor member 10 causes it to move downwardly relative to the bearing 72. As it so moves, the contact made by the inner edge portions 28, 30 of the bottom flanges 24, 26 with the bearing sidewalls 76, 78 squeezes the bearing sidewalls 76, 78 together. The bearing sidewalls 76, 78 move into the spaces 112, 114. At the same time, the ribs 116, 118 bend. This continues until the inner edge portions 28, 30 of the flanges 24, 26 move downwardly below the lower edges 96, 98, into the slots 100, 102. When this happens, the spring energy stored in the ribs 116, 118, and the upper corner portions of the bearing 72, causes the side portions of the bearing 72 to move outwardly into the position shown by FIG. 9.

In similar fashion, and as illustrated by FIGS. 5 and 7, the downward force applied on the floor member 10 causes the floor member 10 to move downwardly relative to the hold down member 16. As floor member 10 moves downwardly, the inner edge portions 28, 30 of its flanges 24, 26 bend the hold down wings 50, 52 downwardly (56) as they bend, the hold down wings 50, 52 move into the spaces 60, 62. This continues until the edge portions 28, 30 of the flanges 24, 26 are below the lower edges 54, 56 of the hold down wings 50, 52. Then, storage spring energy in the hold down wings 50, 52 cause the wings 50, 52 to spring outwardly into their static positions (FIG. 5).

When the floor members 10 are installed they will sit down onto the tops 18 of the bearings 72. They might also set down onto the top portions 44, 46 of the hold down members 16. If so, the hold down members 16 will also function as the bearing for the floor members 10.

During movement of the floor members 10, upward components of force may act on the floor members 10, wanting to lift them upwardly. Referring to FIG. 9, an upward movement of a floor member 10 will cause contact between the inner edge portions 28, 30 of the floor member flanges 24, 26 and the lower edges 96, 98 of the sidewalls 76, 80 of the bearings 72. Thus, any floor member 10 wanting to move upwardly will want to move with it the bearing 72 in the location that is experiencing the upward component of force. The location of the inner edge portions 28, 30 of the floor member flanges 24, 28 within the bearing slots 100, 102 acts to connect the floor member 10 to the bearing 72 in such a way that the upward component of force is distributed by the floor member 10 to all of the bearings to which it is connected. Also, an upward force applied to the bearings 72 will make the sideparts of the bearing to want to move outwardly. This movement is resisted by the gussets 88, 90, 92, 94 and is further resisted by contact between outer edges of the wings 84, 86 and outer edges of wings on adjoining bearings 72.

FIG. 7 clearly illustrates how the hold down member 16 functions to further resist upward movement of a floor member 10 in response to an upward component of force applied to it during longitudinal movement of the floor member 10. As the floor member 10 moves upwardly, the inner edge portions 28, 30 of its flanges 24, 26 contact the lower edges 54, 56 of the hold down wings 50, 52. Owing to the fact that the hold down member 16 is open at the top, any upward force applied on the wings 50, 52 will tend to move the side portions of the hold down member 16 inwardly rather than outwardly. In preferred form, the shoulders 32, 34 are present and the lower wing edges 54, 56 make abutting contact with the shoulders 32, 34. This contact acts to stiffen the hold down wings 50, 52. As shown by FIG. 7, the contact of the wings 50, 52 with the floor member flanges 24, 26 in effect connects together the floor member 10, the hold down member 16 and the longitudinal guide beam 12. This connection serves to apply some of the upward component of force to the longitudinal guide beam 12. The longitudinal guide beam 12 then distributes this force along its length to at least some of its locations of connection to the transverse support beams 14.

The hold down member 16 can be used in some or all of the span regions of the longitudinal guide beams 12. In most installations it is only necessary to use the hold down members in some of the span regions.

Of course, given the information that is set forth above, one could construct other embodiments of hold down members. The embodiment of hold down members and the systems which have been described are all presented for purposes of illustration and not limitation. I am only to be limited to the wording of the claims which follow, interpreted in accordance with the rules of patent claim interpretation, including use of the doctrine of equivalents.

What is claimed is:

1. In a reciprocating floor conveyor of a type comprising a plurality of elongated floor members, each of which is of channel form and has a top panel, a pair of opposite side panels projecting downwardly from the top panel, and a pair of bottom flanges projecting inwardly from the side panels and defining a space between them, elongated guide beams for said floor members; slide bearings on the guide beams, wherein in use the floor members are moved in one direction along the guide beams and the bearings, for advancing a load, and are retracted in the opposite direction, and the improvement comprising:

hold down members attached to at least some of the guide beams, each said hold down member comprising:

a pair of opposite sidewalls;

a bottom wall extending between and interconnecting bottom portions of the sidewalls;

two top parts, one of said top parts being connected to the top of one of the sidewalls and the other said top part being connected to the top of the other sidewall, said top parts extending laterally inwardly from the tops of the sidewalls and each having an inner boundary that is adjacent the inner boundary of the other; and a hold down wing on each side of the hold down member, each hold down wing having a lower edge and each hold down wing sloping downwardly and outwardly from the top part on its side of the hold down member to its lower edge, with the lower edges of the hold down wings being spaced apart laterally a distance that is wider than the space between the bottom flanges of the floor member, wherein an inner space is defined horizontally by and between the sidewalls, and vertically by and between the top parts and the bottom wall, and at least one guide beam is located in said space, and wherein when the hold down member is on the guide beam, and a floor member is installed, the lower edges of the wings of the hold down member are situated above the bottom flanges of the floor member, so that if an upwardly directed force is imposed on the floor member, the bottom flanges of the floor member, when attempting to move upwardly, will contact the lower edges of the wings of the hold down member and such hold down member, through the contact of its wings with the bottom flanges of the floor member, will resist upward movement of the floor member off of the bearings and the guide beam.

2. A conveyor according to claim 1, wherein the bottom flanges of each floor member include upper surface portions bordering the space between the bottom flanges and upwardly extending shoulders outwardly bounding said upper surface portions, said shoulders being positioned to be moved into abutting contact with the lower edges of the wings on the hold down member in response to a predetermined amount of upward movement of the floor member.

3. A conveyor according to claim 2, wherein spaces are defined by and between the wings and the sidewalls of the hold down member into which the wings may swing in response to forces imposed by the bottom flanges of the floor member on the wings of the hold down member as the floor member and the hold down member are being moved relatively together, said spaces allowing the wings to swing inwardly an amount sufficient to allow the bottom flanges of the floor member to move past them, and said wings being stiff enough that they will swing outwardly into positions over the bottom flanges of the floor member following relative movement of the bottom flanges into positions below the lower edges of the wings.

4. A conveyor according to claim 1, wherein spaces are defined by and between the wings and the sidewalls of the hold down member into which the wings may swing in response to forces imposed by the bottom flanges of the floor member on the wings of the hold down member as the floor member and the hold down member are being moved relatively together, said spaces allowing the wings to swing inwardly an amount sufficient to allow the bottom flanges of the floor member to move past them, and said wings being stiff enough that they will swing outwardly into positions over the bottom flanges of the floor member following relative movement of the bottom flanges into positions below the lower edges of the wings.

5. A conveyor according to claim 4, wherein the opposite sidewalls of the hold down member are spaced apart a distance larger than the width of the guide beam, and wherein each sidewall includes at least one inwardly directed longitudinal rib, said ribs making contact with the sidewalls of the guide beam when the hold down member is installed on the guide beam.

6. A conveyor according to claim 5, wherein each sidewall of the hold down member includes a single rib spaced upwardly from the bottom wall and situated closer to the bottom wall than to the top parts of the hold down member.

7. A conveyor according to claim 6, wherein the top parts of the hold down member each includes at least one downwardly extending rib that makes contact with the top of the guide beam when the hold down member is installed on the guide beam, and wherein the vertical height between the bottom wall of the hold down member and the ribs is less than the vertical height of the guide beam.

8. A conveyor according to claim 1, wherein the opposite sidewalls of the hold down member are spaced apart a distance larger than the width of the guide beam, and wherein each sidewall includes at least one inwardly directed longitudinal rib, said ribs making contact with the sidewalls of the guide beam when the hold down member is installed on the guide beam.

9. A conveyor according to claim 8, wherein each sidewall of the hold down member includes a single rib spaced upwardly from the bottom wall and situated closer to the bottom wall than to the top parts of the hold down member.

10. A conveyor according to claim 9, wherein the top parts of the hold down member each includes at least one downwardly extending rib that makes contact with the top of the guide beam when the hold down member is installed on the guide beam, and wherein the vertical height between the bottom wall of the hold down member and the ribs is less than the vertical height of the guide beam.

11. A conveyor according to claim 1, wherein the top parts of the hold down member each includes at least one downwardly extending rib that makes contact with the top of the guide beam when the hold down member is installed on the guide beam, and wherein the vertical height between the bottom wall of the hold down member and the ribs is less than the vertical height of the guide beam.

12. A conveyor according to claim 11, wherein the opposite sidewalls of the hold down member are spaced apart a distance larger than the width of the guide beam, and wherein each sidewall includes at least one inwardly directed longitudinal rib, said ribs making contact with the sidewalls of the guide beam when the hold down member is installed on the guide beam.

13. A conveyor according to claim 1, further comprising transverse support beams situated below and supporting the guide beams, and wherein the slide bearings are positioned on the guide beams at locations where the guide beams sit on the support beams, and wherein the hold down members are attached to the guide beams in span regions between transverse support beams.

14. A conveyor according to claim 13, wherein the bottom flanges of each floor member include upper surface portions bordering the space between the bottom flanges and upwardly extending shoulders outwardly bounding said upper surface portions, said shoulders being positioned to be moved into abutting contact with the lower edges of the wings on the hold down member in response to a predetermined amount of upward movement of the floor member.

15. A conveyor according to claim 14, wherein spaces are defined by and between the wings and the sidewalls of the hold down member into which the wings may swing in response to forces imposed by the bottom flanges of the floor member on the wings of the hold down member as the floor member and the hold down member are being moved relatively together, said spaces allowing the wings to swing inwardly an amount sufficient to allow the bottom flanges of the floor member to move past them, and said wings being stiff enough that they will swing outwardly into positions over the bottom flanges of the floor member following relative movement of the bottom flanges into positions below the lower edges of the wings.

16. A conveyor according to claim 13, wherein spaces are defined by and between the wings and the sidewalls of the hold down member into which the wings may swing in response to forces imposed by the bottom flanges of the floor member on the wings of the hold down member as the floor member and the hold down member are being moved relatively together, said spaces allowing the wings to swing inwardly an amount sufficient to allow the bottom flanges of the floor member to move past them, and said wings being stiff enough that they will swing outwardly into positions over the bottom flanges of the floor member following relative movement of the bottom flanges into positions below the lower edges of the wings.

17. A conveyor according to claim 16, wherein the opposite sidewalls of the hold down member are spaced apart a distance larger than the width of the guide beam, and wherein each sidewall includes at least one inwardly directed longitudinal rib, said ribs making contact with the sidewalls of the guide beam when the hold down member is installed on the guide beam.

18. A conveyor according to claim 17, wherein each sidewall of the hold down member includes a single rib spaced upwardly from the bottom wall and situated closer to the bottom wall than to the top parts of the hold down member.

19. A conveyor according to claim 18, wherein the top parts of the hold down member each includes at least one downwardly extending rib that makes contact with the top of the guide beam when the hold down member is installed on the guide beam, and wherein the vertical height between the bottom wall of the hold down member and the ribs is less than the vertical height of the guide beam.

20. A conveyor according to claim 13, wherein the opposite sidewalls of the hold down member are spaced apart a distance larger than the width of the guide beams, and wherein each sidewall includes at least one inwardly directed longitudinal rib, said ribs making contact with the sidewalls of the guide beam when the hold down member is installed on the guide beam.

21. A conveyor according to claim 20, wherein each sidewall of the hold down member includes a single rib spaced upwardly from the bottom wall and situated closer to the bottom wall than to the top parts of the hold down member.

22. A conveyor according to claim 21, wherein the top parts of the hold down member each includes at least one downwardly extending rib that makes contact with the top of the guide beam when the hold down member is installed on the guide beam, and wherein the vertical height between the bottom wall of the hold down member and the ribs is less than the vertical height of the guide beam.

23. A conveyor according to claim 13, wherein the top parts of the hold down member each includes at least one downwardly extending rib that makes contact with the top of the guide beam when the hold down member is installed on the guide beam, and wherein the vertical height between the bottom wall of the hold down member and the ribs is less than the vertical height of the guide beam.

24. A conveyor according to claim 23, wherein the opposite sidewalls of the hold down member are spaced apart a distance larger than the width of the guide beam, and wherein each sidewall includes at least one inwardly directed longitudinal rib, said ribs making contact with the sidewalls of the guide beam when the hold down member is installed on the guide beam.

25. In a reciprocating floor conveyor:
a plurality of elongated floor members, each of which is of channel form and has a top panel, a pair of opposite side panels projecting downwardly from the top panel, and a pair of bottom flanges projecting inwardly from the side panels and defining a space between them;
a supporting frame structure including an elongated guide beam for each floor member;
slide bearings on the guide beams of a type that will allow the floor member to be snapped into place from above; and
hold down members attached to at least some of the guide beams, each said hold down member comprising:
a pair of side portions, a top part connected to each side portion, a downwardly and outwardly sloping hold down wing, at each side, and a bottom extending between and interconnecting bottom portions of the side portions;
said side portions, said top parts, and said bottom portion together defining an inner space in which a portion of an elongated guide beam is received when the hold down member is installed on the elongated guide beam;
said hold down wings having lower edges which are spaced apart laterally a distance that is wider than the space between the bottom flanges of the floor members;
said hold down member including open spaces inwardly of the hold down wings, into which the hold down wings can bend, said spaces being of sufficient size to allow the hold down wings to bend inwardly an amount sufficient to allow the bent hold down wings to pass relatively through the space between the bottom flanges in response to a downward snap on movement of the floor member onto the bearing of its guide beam, and said hold down wings being stiff enough so they will swing outwardly into positions over the bottom flanges of the floor member following movement of the bottom flanges into positions below the lower edges of the hold down wing.

26. A conveyor according to claim 25, wherein the support frame further includes a plurality of longitudinally spaced apart transverse support beams situated below the elongated guide beams, said elongated guide beams sitting down onto the transverse support beams and being connected to them, and wherein at least some of the bearings are positioned on the elongated guide beams where the elongated guide beams sit on the transverse support beams, and
wherein the hold down members are secured to the elongated guide beams in span regions between the transverse support beams.

* * * * *